United States Patent
Hasegawa et al.

(10) Patent No.: US 12,411,802 B2
(45) Date of Patent: Sep. 9, 2025

(54) RE-ORDERING FILES BY KEYWORD FOR MIGRATION

(71) Applicant: International Business Machines Corporation, Armonk, NY (US)

(72) Inventors: Tohru Hasegawa, Tokyo (JP); Hiroshi Itagaki, Yokohama (JP); Tsuyoshi Miyamura, Yokohama (JP); Atsushi Abe, Ebina (JP); Shinsuke Mitsuma, Machida (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 17/533,491

(22) Filed: Nov. 23, 2021

(65) Prior Publication Data

US 2023/0161731 A1    May 25, 2023

(51) Int. Cl.
| | |
|---|---|
| G06F 16/11 | (2019.01) |
| G06F 7/08 | (2006.01) |
| G06F 40/279 | (2020.01) |
| G10L 13/08 | (2013.01) |

(52) U.S. Cl.
CPC ............ G06F 16/119 (2019.01); G06F 7/08 (2013.01); G06F 40/279 (2020.01); G10L 13/08 (2013.01)

(58) Field of Classification Search
CPC ................................ G06F 16/119; G06F 7/08
See application file for complete search history.

(56) References Cited

U.S. PATENT DOCUMENTS

| | | | |
|---|---|---|---|
| 10,649,697 B2 | 5/2020 | Hasegawa | |
| 11,100,048 B2 | 8/2021 | Dain | |
| 2006/0136525 A1* | 6/2006 | Akelbein | G06F 3/0685 |
| 2008/0307527 A1* | 12/2008 | Kaczmarski | G06F 11/1458 |
| | | | 707/999.204 |
| 2012/0005193 A1* | 1/2012 | Nemoto | G06F 9/5072 |
| | | | 707/E17.014 |
| 2012/0101995 A1* | 4/2012 | Agetsuma | G06F 3/0649 |
| | | | 707/E17.044 |
| 2012/0323934 A1* | 12/2012 | Amir | G11B 27/34 |
| | | | 707/823 |
| 2015/0161161 A1* | 6/2015 | Iwanaga | G06F 16/13 |
| | | | 707/634 |

(Continued)

FOREIGN PATENT DOCUMENTS

JP              6242326        12/2017

Primary Examiner — Marc S Somers
(74) Attorney, Agent, or Firm — Teddi Maranzano

(57) ABSTRACT

A computer implemented method includes identifying a set of target files to be migrated from a primary storage to a secondary storage, extracting text data from the set of target files, identifying a set of keywords corresponding to the extracted text data from the set of target files, determining a number of keyword appearances in each file of the set of target files, assigning an order of migration corresponding to the set of target files such that the target files are written to the secondary storage in order of decreasing number of keywords, and migrating the files to the secondary storage according to the assigned order of migration. The method may additionally include writing the files with the greatest number of keywords closest to the default position of the tape reader. A computer program product and computer system corresponding to the method are also disclosed herein.

17 Claims, 6 Drawing Sheets

(56) References Cited

U.S. PATENT DOCUMENTS

| | | | |
|---|---|---|---|
| 2015/0309929 A1* | 10/2015 | Ishii | G06F 16/185 |
| | | | 711/117 |
| 2015/0310107 A1* | 10/2015 | Alhakimi | G06F 16/41 |
| | | | 707/711 |
| 2016/0117259 A1* | 4/2016 | Hasegawa | G06F 12/121 |
| | | | 711/133 |
| 2018/0004760 A1* | 1/2018 | Bataller | G06N 5/04 |
| 2019/0361622 A1 | 11/2019 | Hasegawa | |
| 2021/0149590 A1 | 5/2021 | Miyamura | |
| 2021/0165834 A1 | 6/2021 | Hasegawa | |

* cited by examiner

| Claim ID | Date | Abstract | File Path |
|---|---|---|---|
| 1 | 2016/1/1 | The straw was peeled off from the juice pack. | customer_claim/claim_1.mp3 |
| 2 | 2016/1/2 | I got some ice cream for my children, but there was something like a piece of thread inside the cup. | customer_claim/claim_2.mp3 |
| 3 | 2016/2/5 | There was a stain on the package that seemed to be caused by a leak. Is it safe to drink? | customer_claim/claim_3.mp3 |

```
{
  "usage": {
    "text_units": 1,
    "text_characters": 100,
    "features": 1
  },
  "language": "en",
  "keywords": [
    {
      "text": "ice cream",
      "relevance": 0.998536,
      "count": 1
    },
    {
      "text": "children",
      "relevance": 0.660062,
```
310A

```
      "count": 1
    },
    {
      "text": "piece of thread",
      "relevance": 0.579361,
      "count": 1
    },
    {
      "text": "cup",
      "relevance": 0.576157,
      "count": 1
    }
  ]
}
```
310B

FIG. 3B

RE-ORDERING FILES BY KEYWORD FOR MIGRATION

BACKGROUND

The present invention relates to the field of data storage, and more specifically to ordering files by keyword for migration.

A linear tape file system (LTFS) is software that allows access to a tape through a file system interface. In many cases, linear tape file systems are realized by saving data on a tape cartridge in a format that conforms to the LTFS format, which is an open specification. With respect to certain tape drives, data is written to a tape while making many round trips in the longitudinal direction of the corresponding tape. In such a case, one such longitudinal trip is referred to as a "wrap". The number of wraps, which varies depending on the format of each tape medium, can be several hundred.

SUMMARY

Various embodiments provide a method for loading data in a target database system using different synchronization programs, as well as a computer system and a computer program product as described by the subject matter of the independent claims. Advantageous embodiments are described in the dependent claims. Embodiments of the present invention can be freely combined with each other if they are not mutually exclusive.

As disclosed herein, a computer implemented method includes identifying a set of target files to be migrated from a primary storage to a secondary storage, extracting text data from the set of target files, identifying a set of keywords corresponding to the extracted text data from the set of target files, determining a number of keyword appearances in each file of the set of target files, assigning an order of migration corresponding to the set of target files such that the target files are written to the secondary storage in order of decreasing number of keywords, and migrating the files to the secondary storage according to the assigned order of migration. The method may additionally include writing the files with the greatest number of keywords closest to the default position of the tape reader. A computer program product and computer system corresponding to the method are also disclosed herein.

BRIEF DESCRIPTION OF THE DRAWINGS

FIG. 3A is a table depicting sample customer data in accordance with an embodiment of the present invention;

FIG. 3B depicts sample keyword extraction corresponding to the sample customer data in accordance with an embodiment of the present invention;

DETAILED DESCRIPTION

Figure 1:
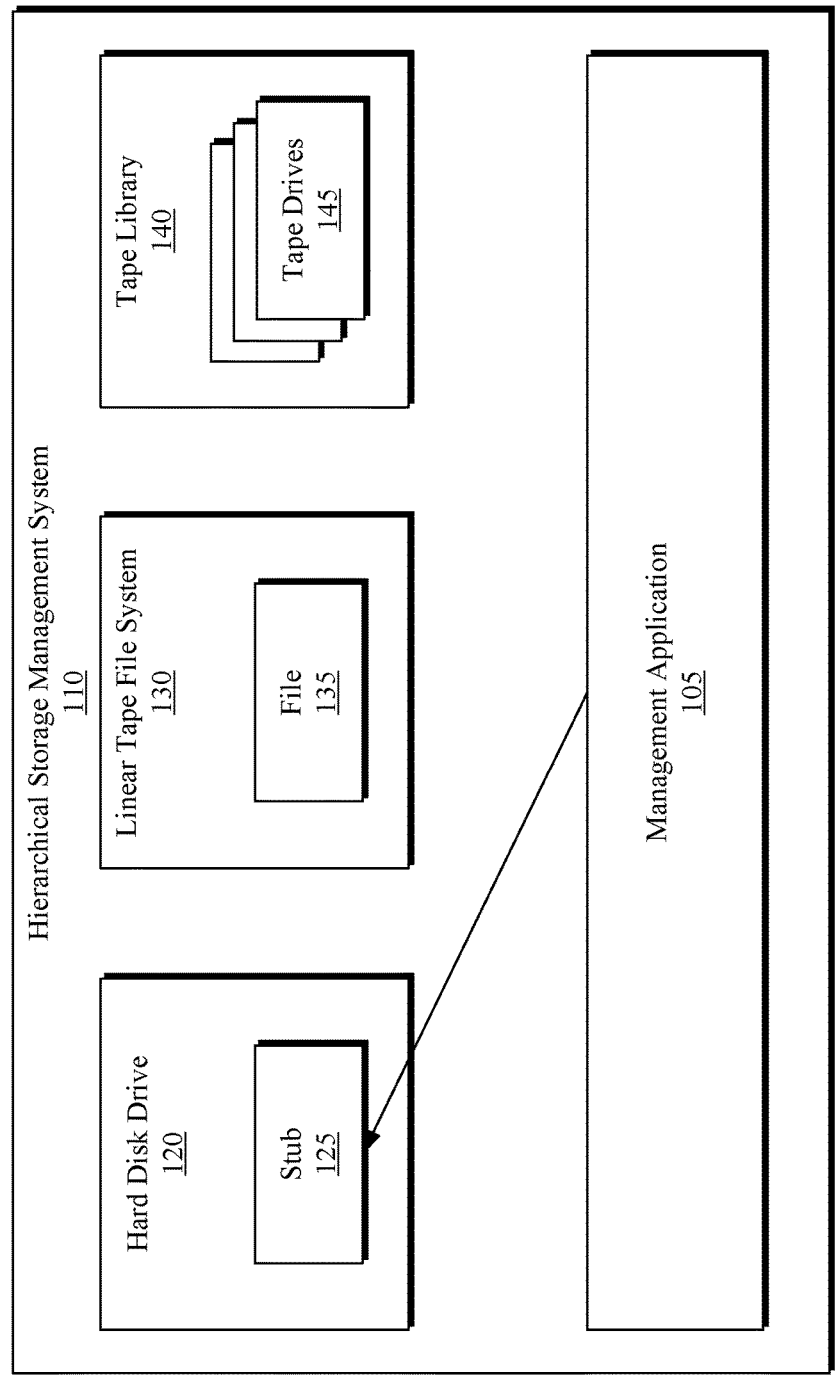
FIG. 1 depicts a storage system 100 in accordance with an embodiment of the present invention.

With linear tape file systems, applications that would conventionally use hard disk drives (HDDs) can be used without altering the applications. However, if an application intended to use an HDD is actually operated using linear tape file systems as-is, it may take longer than expected to access a file depending on the position on the tape where said file is saved, and the application may ultimately time out the access to the file accordingly. To avoid such scenarios, rather than using files directly on linear tape file systems, hierarchical storage management systems using a high-speed storage such as a hard disk drive and/or a solid-state drive as a primary storage may be configured. Some storage implementations utilize linear tape file systems as a secondary storage for hierarchical storage management (HSM).

HSMs typically utilize hard disk drives (HDDs) as a primary storage where the files of applications are saved, and move files to linear tape file systems serving as secondary storage. In some cases, movement from primary to secondary storage is dictated by rules such as "move files that haven't been accessed for a certain period of time". Similarly, such storage systems may implement rules regarding when files are moved; for example, file systems that are typically accessed during the day, or that generally experience less traffic at night, may include protocols indicating that files are moved from primary storage to secondary storage at night.

With respect to the present invention, to migrate a file with linear tape file systems, a file for one tape is prepared before migrating. At the time of migration, natural language processing (NLP) is applied to the contents in the file to extract keywords, and a file with many keywords is written near the beginning of the tape with respect to the longitudinal direction. To use archived data, a recall is made by creating a file list based on results of a search of an external database. Migration is typically performed at a time set by an HSM system policy, as previously described. With respect to embodiments of the present invention, however, migration is performed when a file that is written in the primary storage and that has not been accessed for a certain period of time has used up one whole tape. Since the data on the tape is usually compressed in a tape drive, the file size after compression is considered by utilizing the same compression mechanism elsewhere in storage, and using the compression results to estimate file sizes on tapes. In other embodiments of the present invention, the compression rate of a file may be estimated, and migration may be performed when the estimated compression rate sufficiently exceeds one tape.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

FIG. 1 is a block diagram depicting a storage system 100 in accordance with at least one embodiment of the present invention. As depicted, the storage system 100 includes management application 105, hierarchical storage management system 110, hard disk drive 120, linear tape file system 130, and tape library 140. Storage system 100 may be configured to implement storage solutions configured to combine tape storage systems and disk storage systems. It should be appreciated that any number of elements described with respect to FIG. 1 could be integrated into a computing system, such as is described with respect to FIG. 6.

Management application 105 may be configured to migrate files between hard disk drive 120, linear tape file system 130, and tape library 140. In general, management application 105 is configured to execute file migration methods, such as those described with respect to FIG. 4 and FIG. 5 below. In at least some embodiments, management application 105 is configured to provide a stub 125 to hard disk drive 120, either directly or via an interface available via hierarchical storage management system 110. With respect to the depicted embodiment, management application 105 is implemented on hierarchical storage management system 110.

Hierarchical storage management system 110 is a data storage system that automatically moves data between high-cost and low-cost storage media. In general, HSM system 110 corresponds to a system which stores most of its data on slower data devices, and then copies data to faster disk drives when necessary. As depicted, HSM system 110 includes a hard disk drive 120, a linear tape file system 130, and a tape library 140.

Hard disk drive 120 (or hard disk, hard drive, fixed disk) is an electromechanical data storage device configured to store and retrieve digital data. With respect to the depicted embodiment, hard disk drive 120 is representative of any storage architecture utilized by HSM system 110 that could be considered "high speed" (or "high performance") relative to the other available storage devices. As depicted, hard disk drive 120 includes a file stub 125. File stub 125 indicates the existence of a corresponding file; file stub 125 is placed on hard disk drive 120, while the corresponding file exists in secondary storage. With respect to the depicted embodiment, the corresponding file 135 is stored in linear tape file system 130.

Linear tape file system (LTFS) 130 is a file system that allows files stored on magnetic tape to be accessed in a similar fashion to those on disk or removable flash drives. With respect to the depicted embodiment, LTFS 130 corresponds to tape storage utilized by HSM system 110 that could be considered "low speed" (or "low performance") relative to the other available storage devices. As depicted, LTFS 130 includes file 135; file 135 is stored on LTFS 130 such that it will be available when a request is made with respect to corresponding file stub 125 stored on hard disk drive 120.

Tape library 140 (or tape silo, tape robot, or tape jukebox) is a storage device containing one or more tape drives, a number of slots to hold tape cartridges, a barcode reader to identify tape cartridges, and an automated method for loading tapes (such as a robot). As depicted, tape library 140 includes a plurality of tape drives 145. Tape library 140 may be utilized to store backup data or rarely used data. In at least some embodiments, one or more tape cartridges associated with LTFS 130 may be stored in tape library 140.

With respect to HSM system 130, file movement may typically occur between hard disk drive 120 and linear tape file system 130. In general, moving a file from primary storage (such as hard disk drive 120) to secondary storage (such as LTFS 130) comprises creating a file stub (such as file stub 125) indicating the existence of the file and placing the file stub in primary storage. If the ID of the destination tape is saved as metadata in the file stub, once the stub is accessed, the file can be read from the secondary storage. In at least some embodiments, a response to the access can then be made by moving it to the primary storage. Generally, the movement of a file from primary storage to secondary storage is called migration, whereas moving a file from secondary storage to primary storage is called recall. There may exist intermediate states during migration or recall in which files may exist in both storages. To that end, files may be referred to as either resident files, which are located in the primary storage and not in the secondary storage, pre-migrated files, which are located in the primary storage and have copies in the secondary storage, or migrated files, which are files which exist as stubs in the primary storage after copies have been created and located in the secondary storage.

When an application reads a file in the migrated state and a recall occurs, in the case of conventional implementations of linear tape file systems, a response is made after the file is read from the secondary storage and the stub in the primary storage is returned to the original file. However, with respect to other storage implementations, the stub in the primary storage may be returned to the original file while the data read from the secondary storage is returned directly to the application.

In an example process of archiving a large amount of data using HSM systems (such as HSM system 110), the content of a call from a customer at a call center is archived and used for content mining for business improvement. In such an example, the audio data obtained by recording the telephone conversation is archived by the HSM system, but the information associated with the audio data may be managed by a database rather than the HSM system itself.

Figure 2:
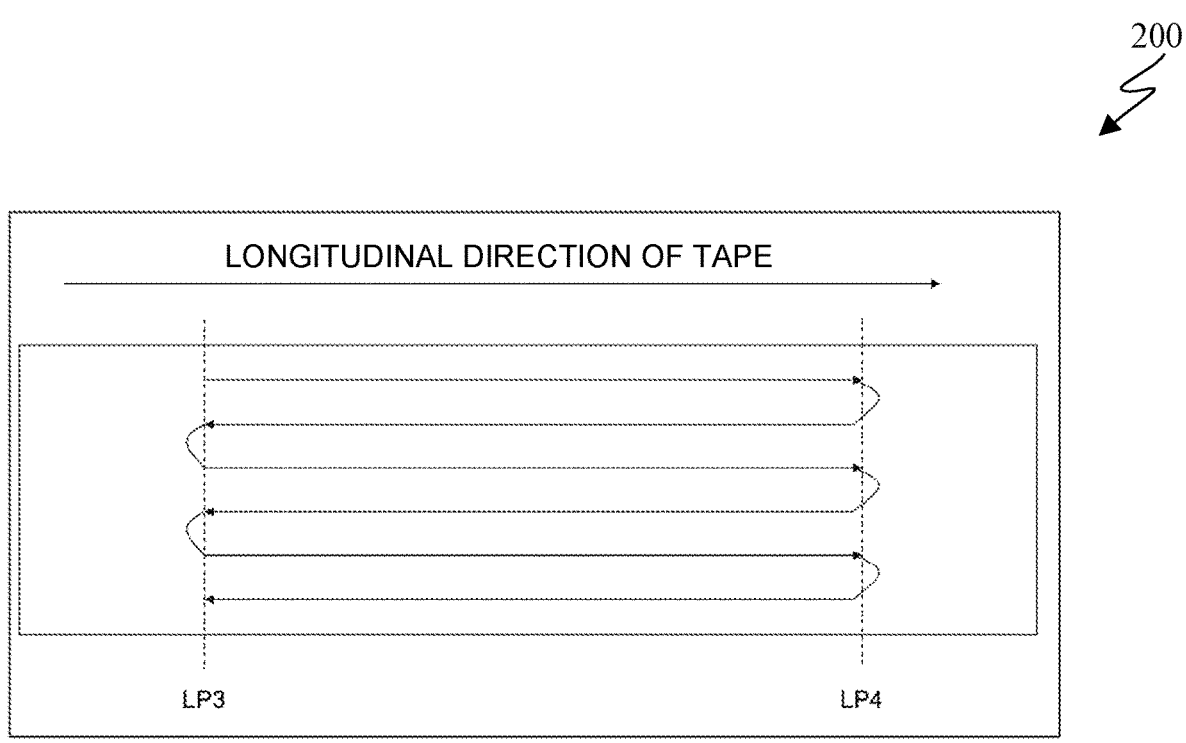
FIG. 2 depicts a tape orientation in accordance with an embodiment of the present invention.

FIG. 2 depicts an example tape 200 in accordance with an embodiment of the present invention. The two ends of the tape in the longitudinal direction are labeled L3 and L4; with respect to embodiments of the present invention, writing begins nearest the L3 end. A "wrap" refers to one length of the tape from L3 to L4 or from L4 to L3. In at least some embodiments, a wrap running from L3 to L4 is referred to as an "odd" wrap, where a wrap running from L4 to L3 is referred to as an "even" wrap.

FIG. 3A is a table 300 depicting sample customer data in accordance with an embodiment of the present invention. The data described with respect to table 300 is intended to be representative of any kind of data which may be stored and managed using the methods described herein. As depicted, table 300 includes columns indicating a claim ID, a date corresponding to the claim, an abstract describing the claim, and a file path for a file corresponding to the claim. FIG. 3B depicts sample keyword extraction (depicted in as sections 310A and 310B) corresponding to the sample customer data contained in table 300 in accordance with an embodiment of the present invention. As depicted, the sample keyword extraction is applied to the text content of the abstract section of table 300 to identify keywords from said section and determine their relevance. Any number of natural language processing (NLP) or natural language understanding (NLU) techniques known in the art may be appropriate for extracting keywords from the text.

Figure 4:
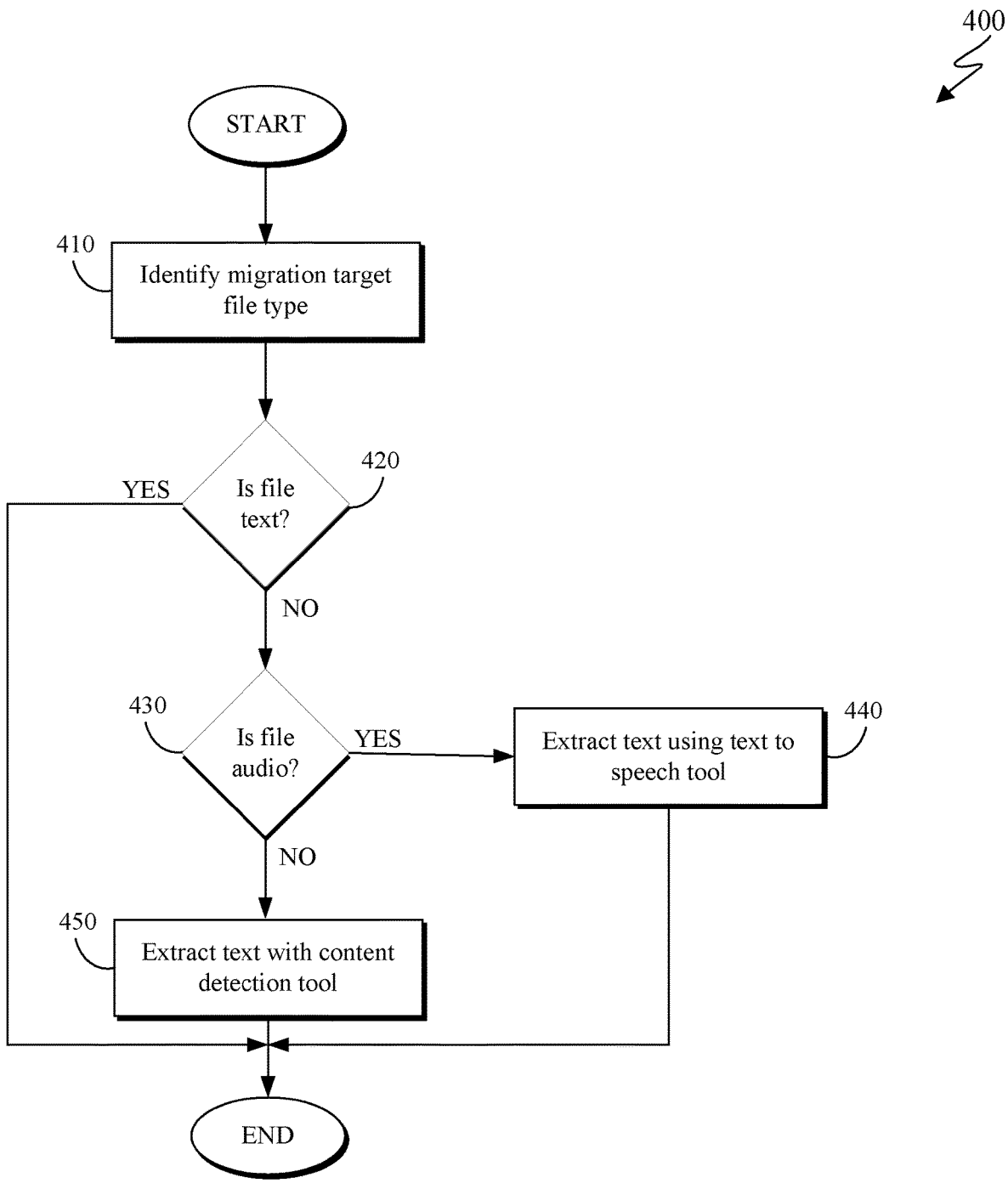
FIG. 4 is a flowchart depicting a text extraction method in accordance with an embodiment of the present invention.

FIG. 4 is a flowchart depicting a text extraction method 400 in accordance with an embodiment of the present invention. As depicted, text extraction method 400 includes identifying (410) a file type corresponding to a target file, determining (420) whether the target file is a text file, determining (430) whether the target file is an audio file, extracting (440) text with a speech to text tool, and extracting (450) text with a content detection tool. Text extraction method 400 may enable text identification from files of various data types.

Identifying (410) a file type corresponding to a target file may include analyzing a target file to determine one or more data types present within the target file. In at least some embodiments, identifying (410) a file type corresponding to the target file includes determining whether the target file includes data of a single type. In general, identifying (410) a file type corresponding to the target file includes identifying one or more data types present for analysis with respect to the target file.

Determining (420) whether the target file is a text file may include determining whether the target file contains only text data. In at least some embodiments, determining (420) whether the target file is a text file includes identifying any portions of text data within the target file. If the target file is a text file (420, yes branch), the method concludes, as no text extraction is required. If the target file is not a text file (420, no branch), i.e., the target file contains data that is not already text, the method continues by determining (430) whether the target file is an audio file.

Determining (430) whether the target file is an audio file may include determining whether the target file contains only audio data. In at least some embodiments, determining (430) whether the target file is an audio file includes identifying any portions of audio data within the target file. If the target file is an audio file (430, yes branch), the method continues by extracting (440) text with a speech too text tool. If the target file is not an audio file (430, no branch), i.e., the target file contains data that is not audio data, the method continues by extracting (450) text with a content detection tool.

Extracting (440) text with a speech to text tool may include leveraging existing speech to text techniques and tools to generate text data corresponding to the audio data in the target file. In embodiments where the target file is contains some audio data and some data of another format, extracting (440) text with a speech to text tool includes utilizing the speech to text tool with respect to the audio data, and providing the remaining data to a content detection tool. Existing tools such as IBM Watson Speech to Text may be utilized to extract text data corresponding to audio portions of the target file. In an embodiment where the target file contains only audio data, the text extraction method 400 concludes upon completion of the speech to text tasks as depicted. In other (not depicted) embodiments, wherein the target file includes non-text, non-audio data in addition to some audio data, text extraction method 400 may continue by extracting (450) text with a content detection tool with respect to the remaining non-audio data.

Extracting (450) text with a content detection tool may include leveraging existing content detection techniques and tools to generate text data corresponding to the data in the target file. In general, extracting (450) text with a content detection tool refers to any methodology for using machine learning (or other methods) to automatically scan unstructured data to identify and extract text. Any number of available tools or techniques may be appropriate for extracting text; for example, one existing tool provides metadata and text extraction from over a thousand different file types.

Text extraction method 400 may additionally include extracting keywords from the extracted text. In at least some embodiments, extracting keywords includes leveraging existing technologies and techniques for keyword extraction. FIG. 3A depicts example text data which may be parsed using keyword extraction techniques, and FIG. 3B depicts the subsequent analysis providing keyword relevance and features. In at least some embodiments, extracting keywords additionally includes determining a number of keyword appearances in each file of the set of target files. Determining a number of keyword appearances in each file of the set of target files may include determining a keyword prevalence with respect to the target files, wherein the keyword prevalence indicates a prevalence of the identified set of keywords with respect to the target file in its entirety.

Figure 5:
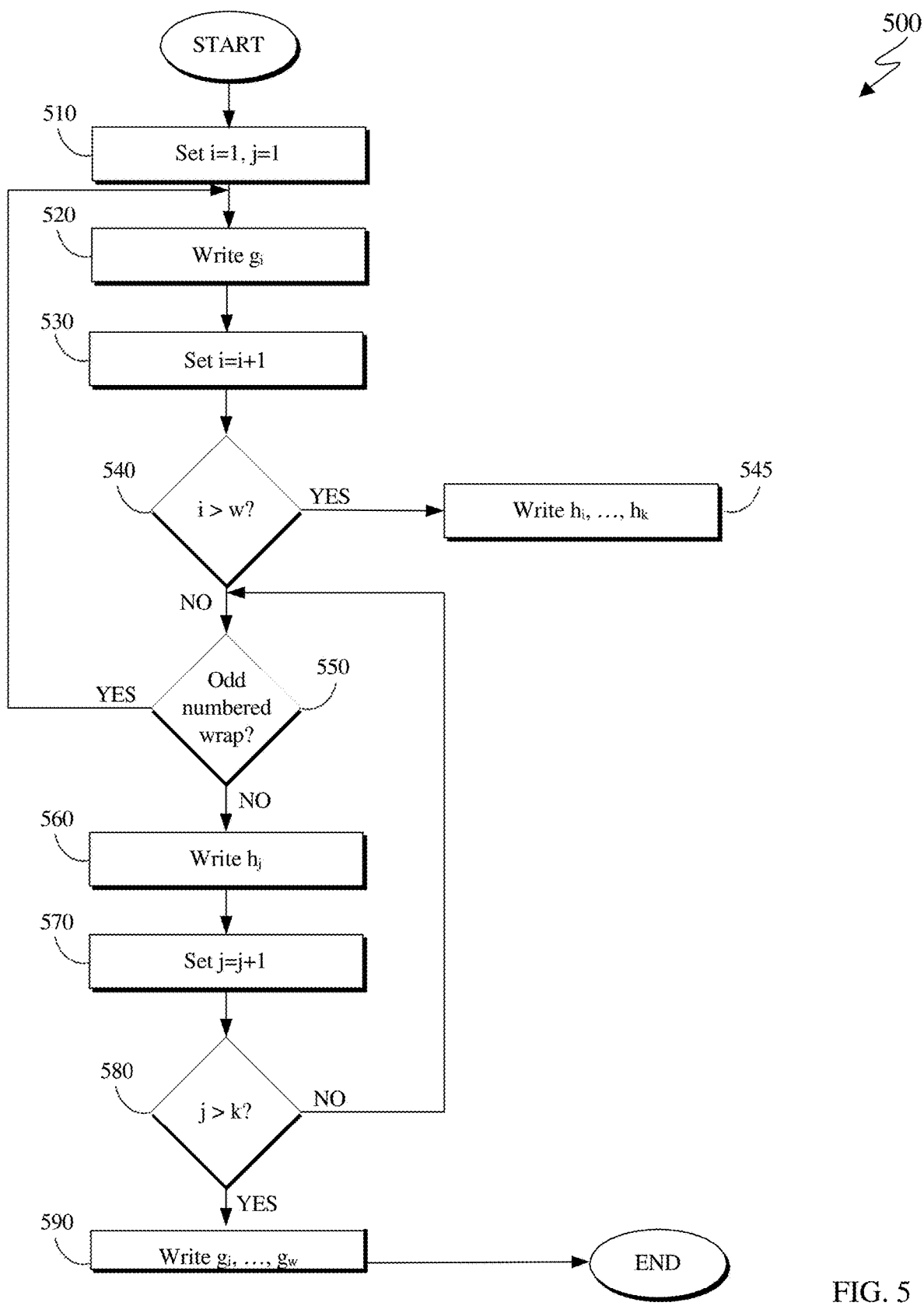
FIG. 5 is a flowchart depicting a file migration method in accordance with an embodiment of the present invention.

FIG. 5 is a flowchart depicting a file migration method 500 in accordance with an embodiment of the present invention. As depicted, file migration method 500 includes setting (510) variable values $i=1$, $j=1$ for a group of files to be archived, writing (520) a file $g_i$, setting (530) variable value $i=i+1$, determining (540) whether i is greater than w, writing (545) a set of files $h_j$ to $h_k$, determining (550) whether the current write is on an odd numbered wrap, writing (560) a file $h_j$, setting (570) variable value $j=j+1$, determining (580) whether j is greater than k, and writing (590) a set of elements $g_i$ through $g_w$. File migration method 500 may enable file migration according to a number of extracted keywords.

Setting (510) variable values $i=1$, $j=1$ for a group of files to be archived may include identifying a group of files $F=\{f_1, f_2, \ldots, f_n\}$ to be archived. In at least some embodiments, setting (510) variable values additionally includes identifying a number of wraps of a corresponding tape on which files are written, and setting w=(said number of wraps of the corresponding tape on which files are written)/2. In at least some embodiments, the group of files F is sorted according to the number of extracted keywords (as extracted via text extraction method 400) in descending order; in other words, $f_1$ has the most extracted keywords of the files in the group, $f_2$ has the second most extracted keywords, etc. Generally, the group of files F may correspond to an assigned order of the files based on keyword prevalence. Setting (510) variable values may additionally include splitting the group of files to be written F into two groups, wherein the first w files in F are in a first group $G=\{g_1, g_2, \ldots, g_w\}$, and the remaining files in F (excluding those in G) are in a second group $H=\{h_1, h_2, \ldots, h_k\}$. Setting (510) variable values $i=1$, $j=1$ for a group of files to be archived may include setting a counter for variable i to $i=1$ and setting a counter for variable j to $j=1$. Variables i and j do not necessarily have to be tracked using a counter but can be set using any mechanism for setting and adjusting variable values. In general, variables i and j may be indicative of which iteration of writing files the method is currently executing.

Writing (520) a file $g_i$ may include, with respect to a first iteration of the step, writing file $g_1$ to a tape. In general, writing (520) a file $g_i$ includes writing a current file $g_i$ for a current iteration to the next available position on a target tape. Writing (520) a file $g_i$ generally refers to writing a file from group G as previously defined.

Setting (530) variable value $i=i+1$ may include incrementing variable value i by 1 such that a new value for i is $i+1$. In at least some embodiments, setting (530) variable value $i=i+1$ occurs responsive to a file $g_i$ corresponding to iteration i being written on the target tape. In general, variable value i indicates which file from group G is to be written.

Determining (540) whether i is greater than w may include comparing variable value i for the current iteration to w. As described previously w is calculated according to w=(number of wraps of a corresponding tape on which files are to be written)/2. If it is determined that i is greater than w (540, yes branch), the method continues by writing (545) a set of files $h_i$ to $h_k$. If it is determined that i is not greater than w (540, no branch), the method continues by determining (550) whether the tape has switched to an odd-numbered wrap. Generally, determining (540) whether i is greater than w serves as a check determining whether all of the files in set G have been written.

Writing (545) a set of files h to $h_k$ may include writing the files from group H in sequence. In general, writing (545) a set of files $h_i$ to $h_k$ includes, for each file $h_i$, writing said file $h_i$ to a next available position on the target tape.

Determining (550) whether the current write is on an odd numbered wrap may include identifying a next available position with respect to the target tape. If the current write is on an odd numbered wrap (550, yes branch), the method continues by writing (520) a file $g_i$. If the current write is not on an odd numbered wrap (i.e., the current write is on an even numbered wrap) (550, no branch), the method continues by writing (560) a file $h_j$. Writing files to the odd numbered wrap positions said files closest to the default position of the head configured to read the tapes, enabling said files to be read more quickly.

Writing (560) a file $h_j$ may include, with respect to a first iteration of the step, writing file $h_j$ to a tape. In general, writing (520) a file $h_j$ includes writing a current file $h_j$ for a current iteration to the next available position on a target tape. Writing (520) a file $h_j$ generally refers to writing a file from group H as previously defined.

Setting (570) variable value j=j+1 may include incrementing variable value j by 1 such that a new value for j is j+1. In at least some embodiments, setting (570) variable value j=j+1 occurs responsive to a file $h_j$ corresponding to iteration j being written on the target tape. In general, variable value j indicates which file from group H is to be written.

Determining (580) whether j is greater than k may include comparing variable value j for the current iteration to k, wherein k is a number of elements in group H. If it is determined that j is greater than k (580, yes branch), the method continues by writing (590) a set of files $g_i$ through $g_w$.

Writing (590) a set of files $g_i$ through $g_w$ may include writing the remaining files from group G in sequence. In general, writing (590) a set of files from $g_i$ to $g_w$ includes, for each file $g_i$, writing said file $g_i$ to a next available position on the target tape.

Figure 6:
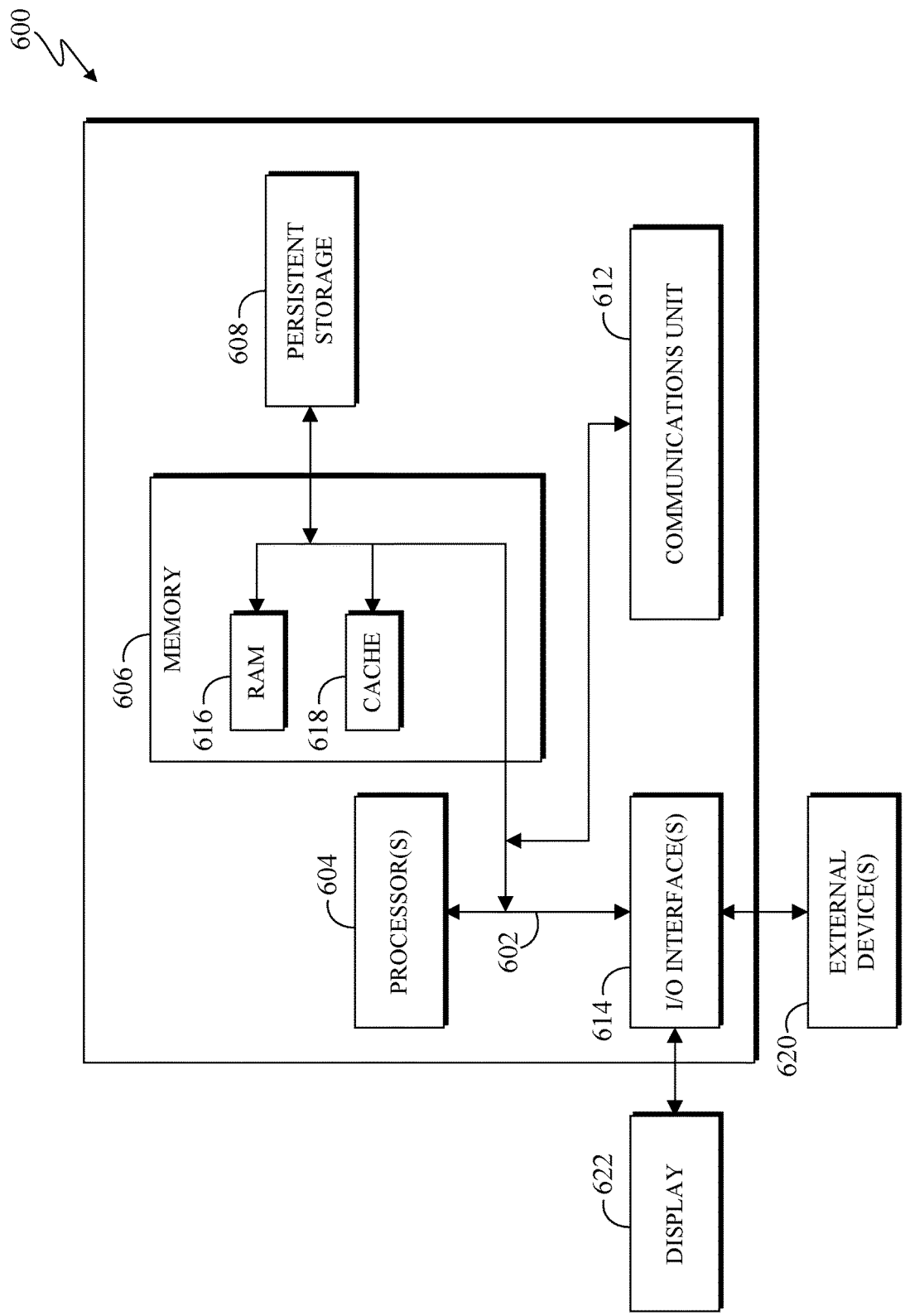
FIG. 6 represents a computerized system, suited for implementing one or more method steps as involved in the present subject matter.

FIG. 6 depicts a block diagram of components of a computing system in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications, and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

One or more programs may be stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 614. I/O interface(s) 614 also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
    identifying a set of target files to be migrated from a primary storage to a secondary storage;
    applying a natural language processing program to the set of target files to extract text data from the set of target files;
    identifying a set of keywords corresponding to the extracted text data from the set of target files;

determining a number of keyword appearances in each file of the set of target files;

assigning an order of migration corresponding to the set of target files, wherein the set of target files are ordered in descending order and grouped into a first group and a second group; and migrating the files to the secondary storage according to the assigned order of migration by selecting from the first group or the second group based on a wrap number of a tape on which files are written being even or odd.

2. The computer implemented method of claim 1, wherein determining a number of keyword appearances in each file of the set of target files includes determining a keyword prevalence with respect to the target files, wherein the keyword prevalence indicates a prevalence of the identified set of keywords with respect to the target file in its entirety.

3. The computer implemented method of claim 1, wherein extracting text data from the set of target files includes leveraging text to speech techniques to extract text data from one or more portions of audio data from the set of target files.

4. The computer implemented method of claim 1, wherein extracting text data from the set of target files includes leveraging content detection techniques to extract text data from one or more portions of non-audio, non-textual data from the set of target files.

5. The computer implemented method of claim 1, wherein assigning an order of migration corresponding to the set of target files includes adjusting or altering an existing order of migration.

6. The computer implemented method of claim 1, wherein migrating the files to the secondary storage according to the assigned order of migration occurs when a file that is written in the primary storage and that has not been accessed for a certain period of time has used up one whole tape.

7. A computer program product comprising:
one or more computer readable storage media and program instructions stored on the one or more computer readable storage media, the program instructions comprising instructions to:
identify a set of target files to be migrated from a primary storage to a secondary storage;
apply a natural language processing program to the set of target files to extract text data from the set of target files;
identify a set of keywords corresponding to the extracted text data from the set of target files;
determine a number of keyword appearances in each file of the set of target files;
assign an order of migration corresponding to the set of target files, wherein the set of target files are ordered in descending order and grouped into a first group and a second group; and
migrate the files to the secondary storage according to the assigned order of migration by selecting from the first group or the second group based on a wrap number of a tape on which files are written being even or odd.

8. The computer program product of claim 7, wherein the program instructions to determine a number of keyword appearances in each file of the set of target files comprise instructions to determine a keyword prevalence with respect to the target files, wherein the keyword prevalence indicates a prevalence of the identified set of keywords with respect to the target file in its entirety.

9. The computer program product of claim 7, wherein the program instructions to extract text data from the set of target files comprise instructions to leverage text to speech techniques to extract text data from one or more portions of audio data from the set of target files.

10. The computer program product of claim 7, wherein the program instructions to extract text data from the set of target files comprise instructions to leverage content detection techniques to extract text data from one or more portions of non-audio, non-textual data from the set of target files.

11. The computer program product of claim 7, wherein the program instructions to assign an order of migration corresponding to the set of target files comprise instructions to adjust or alter an existing order of migration.

12. The computer program product of claim 7, wherein migrating the files to the secondary storage according to the assigned order of migration occurs when a file that is written in the primary storage and that has not been accessed for a certain period of time has used up one whole tape.

13. A computer system comprising:
one or more computer processors;
one or more computer-readable storage media;
program instructions stored on the computer-readable storage media for execution by at least one of the one or more processors, the program instructions comprising instructions to:
identify a set of target files to be migrated from a primary storage to a secondary storage;
apply a natural language processing program to the set of target files to extract text data from the set of target files;
identify a set of keywords corresponding to the extracted text data from the set of target files;
determine a number of keyword appearances in each file of the set of target files;
assign an order of migration corresponding to the set of target files, wherein the set of target files are ordered in descending order and grouped into a first group and a second group; and
migrate the files to the secondary storage according to the assigned order of migration by selecting from the first group or the second group based on a wrap number of a tape on which files are written being even or odd.

14. The computer system of claim 13, wherein the program instructions to determine a number of keyword appearances in each file of the set of target files comprise instructions to determine a keyword prevalence with respect to the target files, wherein the keyword prevalence indicates a prevalence of the identified set of keywords with respect to the target file in its entirety.

15. The computer system of claim 13, wherein the program instructions to extract text data from the set of target files comprise instructions to leverage text to speech techniques to extract text data from one or more portions of audio data from the set of target files.

16. The computer system of claim 13, wherein the program instructions to extract text data from the set of target files comprise instructions to leverage content detection techniques to extract text data from one or more portions of non-audio, non-textual data from the set of target files.

17. The computer system of claim 13, wherein the program instructions to assign an order of migration corresponding to the set of target files comprise instructions to adjust or alter an existing order of migration.

* * * * *